Jan. 22, 1924.

G. J. BOHN ET AL

WRENCH

Filed Nov. 25, 1921

1,481,250

Patented Jan. 22, 1924.

1,481,250

UNITED STATES PATENT OFFICE.

GEORGE J. BOHN AND FRED W. WERNER, OF MILWAUKEE, WISCONSIN.

WRENCH.

Application filed November 25, 1921. Serial No. 517,667.

*To all whom it may concern:*

Be it known that we, GEORGE J. BOHN and FRED W. WERNER, both citizens of the United States, and residents of Milwaukee, in the county of Milwaukee and State of Wisconsin, have invented certain new and useful Improvements in Wrenches; and we do hereby declare that the following is a full, clear, and exact description thereof.

Our invention relates to a wrench. It has for its object the provision of a device that will be adjustable to fit a nut of any size in an especially rapid manner and can be removed therefrom with the greatest readiness. It contemplates the utilization of a minimum number of parts, the ease of manufacture of these parts, and especial strength and simplicity of construction. It facilitates nicety of adjustment with respect to the nut or similar object. The adjustment with respect to the nut is accomplished by the manual advancement of a sliding collar advancing a wedge with respect to a jaw.

The detaching of the wrench is accomplished by the withdrawal of the collar, and the retraction of the jaw by means of a spiral spring.

Other objects and advantages will appear as the description proceeds. Reference is had to the accompanying drawings, in which:—

Figure 1:
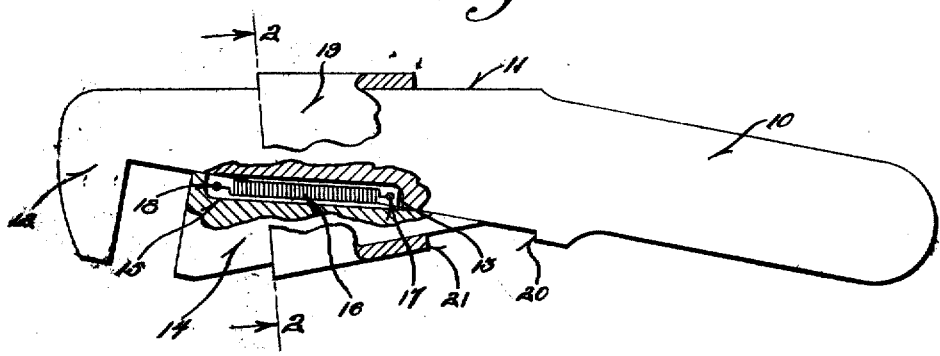
Figure 1 is a side elevation with parts in section.
Figure 2:
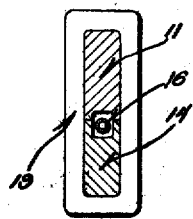
Figure 2 is a cross section on the line 2—2 of Figure 1.

Handle 10 is integral with arm 11 and jaw 12. Arm 11 is chambered at 13. Wedge 14 is chambered at 15. A spiral spring 16 has its ends affixed to arm 11 by pin 17 and to wedge 14 by pin 18. Dimensions of chambers 13 and 15 are such as to facilitate the ready advancement and retraction of the wedge. A collar 19 slidably engages arm 11 and wedge 14 and maintains them in engagement. The movement of collar 19 towards the handle is limited by lug 20 which engages with shoulder portion 21 of the collar.

In the operation of the device, collar 19 is moved away from the handle manually and as it does so, the wedge 14 moves downwardly on the inclined surface of arm 11, thus decreasing the distance between the wedge 14 and jaw 12. When the nut is engaged, the hand of the operator may be removed from all portions of the device. The handle may be grasped to manipulate the wrench. The pressure exerted by the nut on jaw 14 does not operate to move the jaw because of the wedging action and frictional engagement.

When it is desired to disengage the wedge from the nut, the collar 19 is manually retracted. In this retraction spring 16 moves wedge 14 rearwardly so that at all times collar 19, arm 11, and wedge 14 are in contact. The extreme rearward movement ceases when shoulder 21 engages lug 20.

It is apparent that the device facilitates speedy adjustment to nuts of different sizes as the distance between the wedge 14 and jaw 12 is regulated by the mere travel of collar 19.

We claim as our invention:—

1. In a wrench, the combination of a handle, an arm rigid therewith having two faces inclined towards each other, one of said faces having a recess therein, a wedge-shaped member slidable on one of said faces and having a chamber therein, a collar enveloping said arm and said wedge, and a spring affixed to said wedge-shaped member and said arm for retracting said wedge-shaped member with respect to said arm, said spring being completely housed in said chamber and said recess.

2. In a wrench, the combination of a handle, an arm rigid therewith having two faces inclined towards each other, one of said faces having an elongated chamber therein, a wedge shaped member having an elongated chamber in one of its faces slidable on said handle, a spring affixed to said wedge shaped member and said arm and housed completely in said chambers, and a collar enveloping said wedge shaped member and said arm for adjusting said wedge shaped member on said arm.

3. A wrench comprising a shank having a rigid jaw at the end, an adjustable jaw slidably engaging with the under part of the shank, a sleeve surrounding the shank and jaw and slidable upon the shank, said jaw and shank having registering grooves extending longitudinally in the opposed faces thereof and a retractile spring, the ends of which are secured in the respective grooves.

4. A wrench comprising a shank with a fixed jaw, a wedge-shaped movable jaw, a movable sleeve embracing the jaw and the shank, channels in the jaw and the shank, and a spring arranged in the said channels and adapted to pull the movable jaw into the said sleeve, the spring being totally enclosed in the said channels so as to be invisible.

5. A wrench embodying in its construction a shank having a jaw on one end, a wedge-shaped jaw slidable upon the under side of the shank, an angular sleeve surrounding the shank and jaw, said shank and jaw and sleeve having correspondingly inclined walls slidably engaging with one another, said shank and jaw having registering recesses in the opposed faces thereof and a spring, the ends of which are secured in respective recesses.

6. A wrench comprising a handle, a slide section, and a fixed jaw on the outer end thereof, a bearing surface on the inner side of the slide section, a wedge-shaped jaw slidably mounted thereon, a yoke enclosing the slide section and the wedge-shaped jaw, a groove formed in the bearing surface, a communicating groove formed in the adjacent face of the wedge shaped jaw, and an extensible spring enclosed by said grooves and having its opposite ends secured to the slide section and jaw respectively.

7. A wrench comprising a handle, a slide section and a fixed jaw on the outer end thereof, a bearing surface on one side of the slide section, an angularly disposed friction surface formed on the opposite side thereof, a wedge-shaped jaw slidably mounted on the bearing surface, a yoke enclosing the slide section and the wedge-shaped jaw, a groove formed in the bearing surface of the slide section, a groove formed in the adjacent face of the wedge-shaped jaw, a helical spring disposed within said grooves, and means securing the opposite ends of said spring to the jaw and the slide section respectively.

8. In a wrench, a fixed jaw and tapered neck therefrom leading to a handle, a tapered sleeve mounted on said neck, a wedge-shaped movable jaw inserted in said sleeve, the faces of said neck and said sleeve being recessed, and a spring in said recesses and holding said movable jaw to said neck.

In testimony that we claim the foregoing we have hereunto set our hands at Milwaukee, in the county of Milwaukee and State of Wisconsin.

GEORGE J. BOHN.
FRED W. WERNER.